United States Patent [19]

Harries

[11] 4,155,603
[45] May 22, 1979

[54] ANTI-SKID VEHICLE BRAKING SYSTEMS

[75] Inventor: David A. Harries, West Midlands, England

[73] Assignee: Girling Limited, Birmingham, England

[21] Appl. No.: 858,361

[22] Filed: Dec. 7, 1977

[30] Foreign Application Priority Data

Dec. 15, 1976 [GB] United Kingdom ............... 52265/76

[51] Int. Cl.² ............................................. B60T 8/02
[52] U.S. Cl. .................................. 303/110; 303/117; 303/119
[58] Field of Search ............... 303/110, 112, 113, 117, 303/118, 119

[56] References Cited

U.S. PATENT DOCUMENTS

| | | | |
|---|---|---|---|
| 3,820,856 | 6/1974 | Adahan | 303/117 |
| 3,937,527 | 2/1976 | Eckhart | 303/113 |

Primary Examiner—Trygve M. Blix
Assistant Examiner—Reinhard J. Eisenzopf
Attorney, Agent, or Firm—Scrivener, Parker, Scrivener & Clarke

[57] ABSTRACT

In a fluid pressure-operated anti-skid braking system for vehicles, operating fluid from a supply is supplied to the wheel brake through a fluid-flow control valve interposed between the supply and the brake. A deceleration responsive device responsive to a skid signal is incorporated for operating the control valve to relieve the brake pressure of the fluid supplied to the brake when the deceleration of the wheel is excessive and exceeds a pre-determined value. A memory for storing a memory pressure dependant on the brake pressure at a skid is incorporated, and the memory pressure operates the control valve directly during a first stage of brake re-application, and provides a changeover point between first and second stages of brake re-application. The second stage comprises continued re-application but at a reduced rate of pressure increase.

8 Claims, 4 Drawing Figures

ANTI-SKID VEHICLE BRAKING SYSTEMS

SPECIFIC DESCRIPTION

This invention relates to improvements in fluid-pressure operated anti-skid braking systems for vehicles of the kind in which operating fluid from a supply for actuating a wheel brake is supplied to the brake through fluid-flow control valve means interposed in the line between the supply and the brake, and deceleration responsive means responsive to a skid signal are incorporated for operating the valve means to relieve the brake pressure of the fluid supplied to the brake at a skid point when the deceleration of the wheel is excessive and exceeds a predetermined value, a memory being incorporated for storing a memory pressure dependent upon the brake pressure occuring at the skid point to provide a datum or changeover point between first and second successive stages of brake re-application, the first stage comprising the re-application of the operating fluid from the supply until an intermediate pressure less than the pressure at the skid point is attained at the changeover point, and the second stage comprising the continued re-application of the supply of operating fluid at a reduced rate of pressure increase.

In known anti-skid braking systems of the kind set forth the memory pressure is utilised to control operation of an additional pressure regulator or re-application valve which, in turn, is operative to control either directly, or indirectly by manipulation of the control valve means, the re-application of the operating fluid from the supply, at the two successive rates.

According to our invention in an anti-skid braking system of the kind set forth for a vehicle the memory pressure is utilised directly to control operation of the control valve means throughout the first stage of brake re-application.

Since no additional pressure regulator or re-application valve is required the construction is simplified which, in turn, has the advantage of increasing reliability due to the elimination of a number of components, for example seals, pistons and diaphragms, which are liable to fail in service.

To increase the pressure at the reduced rate during the second stage the memory pressure controlling operation of the control valve means is itself increased gradually by the application thereto of a higher operator-controlled pressure through a suitable restrictor.

In one construction the control valve means comprises a relay valve having an area exposed to a pressure for operating the relay valve and until the skid point is reached the control pressure comprises the operator-controlled pressure which is supplied through an open latch valve to both the said area and the memory, the latch valve closing at the skid point and remaining shut during brake re-application in a common cycle so that the said area can thereafter be exposed only to the memory pressure or to the memory pressure suitably augmented by the original operator-controlled pressure but supplied at the reduced rate.

Conveniently the control valve means, the deceleration responsive means, the memory, the latch valve and the restrictor are all incorporated in a common housing of a single unit with the restrictor housed in a first inlet passage for connection to a supply of operator controlled pressure, suitably a pedal-operated air treadle valve, a second inlet passage leading to one side of the control valve means and for connection to the main supply of air under pressure, an outlet for connection to the wheel brake, and a connection from the deceleration responsive means for connection to a wheel speed sensor. This has the advantage that the unit can be incorporated in existing pneumatically-operated braking systems with a minimum of adaptation.

One embodiment of an invention is illustrated in the accompanying drawings in which.

Figure 1:
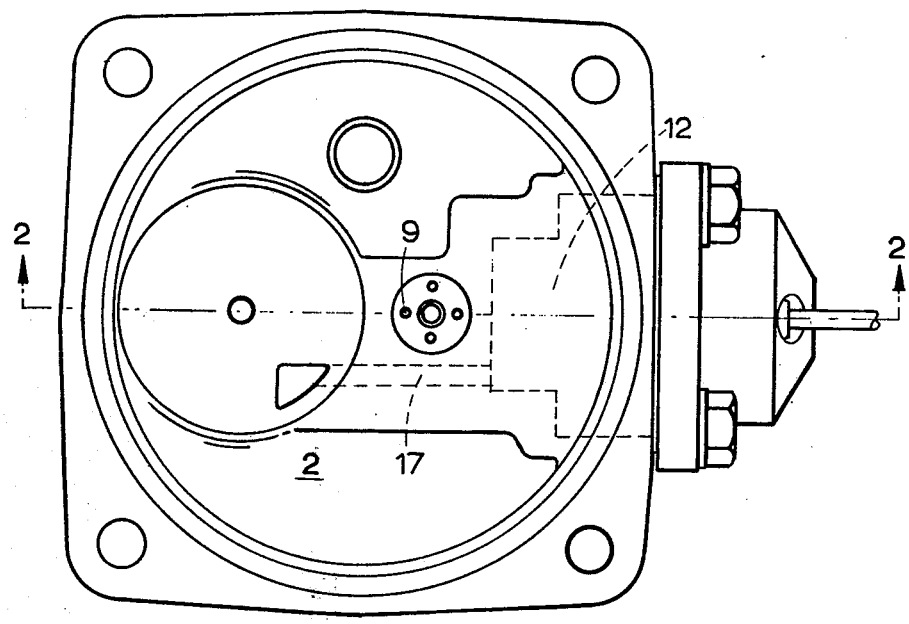
FIG. 1 is a plan view of a skid control unit for a pneumatically-operable braking system with a top cover plate omitted for clarity.

The unit illustrated in the drawings comprises a housing having a first inlet passage 1 for connection to a pedal-operated treadle air valve, a memory chamber 2 and a latch valve 3 which is in communication with the inlet passage 1. The latch valve 3 comprises a valve member 4 for engagement with a seating surrounding a port 5 and carried by a flexible diaphragm 6. The valve member 4 is provided with a bleed orifice 7 providing a restricted flow into a chamber 8 which is separate from the memory chamber 2 when the latch valve 3 is shut with the valve member 4 engaging with the seating.

A one-way valve 9 permits flow from the memory chamber 2 in one direction only into a passage 10 which, in turn, communicates with a longitudinally extending passage 11 co-axial with the first inlet passage 1 and leading into an enlarged recess 12. A one-way valve 13 located between the first inlet passage 1 and the passage 11 on the downstream side of the port 5 comprises a valve member 14 for engagement in a closed position with a seating 15 substantially to prevent flow from the inlet passage 1 into the passage 11 but the valve member 14 is provided with an orifice 16 to permit a limited flow through the valve in that direction even though the valve 13 is closed.

A transverse by-pass passage 17 leads from a chamber 18 between the port 5 and the latch valve member 4 and into the recess 12 which communicates with atmosphere through a deceleration responsive means, the deceleration responsive means comprise a normally closed double-acting solenoid-operated valve assembly 19 which is responsive to electrical signals provided by an electric control means 41 so that in the event of a skid condition the chamber 12 is placed in communication with atmosphere but is closed to the end of passage 11 where it enters the recess 12.

The housing also accommodates fluid-flow control means comprising a relay valve 20 for controlling communication between an inlet supply passage 21 for connection to a supply of operating pneumatic pressure, conveniently a reservoir or tank, and an outlet supply passage 22 for connection to an actuator of a brake for braking a wheel of which the rotational speed is sensed by the sensor. The relay valve 20 comprises a bore 23 of stepped outline which is normal to the passage 11 and which is closed at its inner end of greater area by a wall 24 which separates it from the memory chamber 2.

A piston 25 works in the inner portion 26 of the bore 23 which is of greater diameter and on its outer face carries a valve head 27 engageable with the inner end of sleeve 28 which is guided to slide in an inwardly projecting axial skirt 29 of a closure member 30 for the outer end of the bore 23 which is of smaller diameter. The sleeve 28 has a radial flange 31 comprising a valve head which is urged inwardly towards a shoulder 32 at the step at change in diameter by means of a compression spring 33, and the closure member 30 is provided with at least one exhaust port 34 communicating with the interior of the sleeve. The inlet passage 21 is located on the same side of the seating 32 as the valve member 31 and the outlet passage is located on the opposite side thereof. Thus, in the inoperative position shown, communication between the inlet passage 21 and a chamber 35 in the bore 23 to which the side of the piston 25 carrying the valve head 27 is exposed is cut-off by the engagement of the head 31 with the seating 32, and that chamber 35 is exhausted to atmosphere through the port 34 since the head 27 is spaced from the sleeve 28.

A control chamber 36 in the bore 23 on the side of the piston 25 opposite the head 27 is connected directly to the recess 12 through a passage 37 and to the memory chamber 2 through a one-way valve 38 which permits flow from the control chamber 36 into the memory chamber 2, but prevents flow in the opposite direction. An orifice 39 also permits flow betweeen the two chambers 2 and 36 in both directions.

When the brakes are to be applied the solenoid operated valve 19 is closed to isolate the recess 12 from atmosphere and the latch valve 3 is open. Control pressure from the treadle valve is supplied from the inlet passage 1 to the control chamber 36 of the relay valve 20 through the port 5, the passage 17, the recess 12 and the passage 37. The pressure in the control chamber 36 also enters the memory chamber 2 through the one-way valve 38 so that the pressure in the memory chamber 2 is equal to the pressure in the control chamber 36 which acts on the exposed area of the piston 25 to urge the piston away from the wall 24. This causes the valve head 27 to engage with the upper end of the sleeve 28 to isolate the chamber 35 from atmosphere. Thereafter, further movement of the piston 25 in the same direction moves the flange 31 away from the seating 32 so that the brakes are operated by pressure from the inlet passage 21 to the outlet passage 22 through the chamber 23.

When the deceleration of a braked wheel exceeds a predetermined value, the solenoid-operated valve 19 is energised by a skid signal. The valve 19 opens to exhaust to atmosphere through the passages 37 and 17 and an exhaust port 40 the pressures in the control chamber 36 and the chamber 18, but closes the passage 9 to prevent exhaustion from the memory chamber 2.

The reduction in pressure in the control chamber 36 permits the piston 25 to move towards the wall 24 with the sleeve 28 also moving towards the wall 24 under the influence of the spring 33 until the flange 31 engages with the seating 32 to isolate the inlet passage 21 from the outlet passage 22. Further movement of the piston 25 in the same direction moves the head 27 away from the sleeve 28 so that air under pressure in the chamber 35 is exhausted to atmosphere through the port 34.

The reduction in pressure in the chamber 18 provides a pressure drop across the valve member 4 so that the latch valve 3 closes to cut-off communication from the inlet passage 1 to the recess 12 through the passage 17. A small quantity of air can still pass from the inlet passage 1 into the recess through the orifice 16 and into the chamber 8 through the orifice 7 to keep the latch valve 3 closed.

Operation of the double-acting solenoid operated valve to close the passage 11 serves to trap in the memory chamber 2 a volume of air at a pressure equal to the pressure effective in the control chamber 36 when the deceleration of the braked wheel exceeded a predetermined value and, during the period that the brakes are released, that pressure decays by leakage through the orifice 39 into the control chamber 36.

After the skid condition has been corrected the solenoid is de-energised to isolate the recess 12 from atmosphere and open communication from the passage 11 into the recess. This permits the pressure at that time present in the memory chamber 2 to be applied directly to the exposed area of the piston 25 through the one-way valve 9, the passages 10 and 11, the recess 12 and the passage 37 in order to move the piston 25 rapidly away from the wall 24, initially isolating the chamber 35 from atmosphere and thereafter moving the flange 31 away from the seating 32 to re-connected the inlet passage 21 with the outlet passage 22.

Thus the brakes are re-applied rapidly through a first stage under the control of a control pressure which is less than the effective control pressure when skidding occured, until a point is reached at which the memory pressure in the control chamber 36 which acts on the piston 25 balances the applied pressure in the chamber 35.

Thereafter the control pressure in the chamber 36 can still increase, but at a slower rate, by means of a restricted flow through the orifice 16 in the one-way valve 13 which has also to increase at the same rate as the pressure in the memory chamber 2. Thus the brakes are re-applied in a second stage but at a reduced rate of pressure increase. This continues through the remainder of the brake re-application in a common cycle following a skid condition, until the end of the cycle, or until a further skid condition is reached, whereupon the sequence of brake release and re-application described above is repeated.

Figure 4:
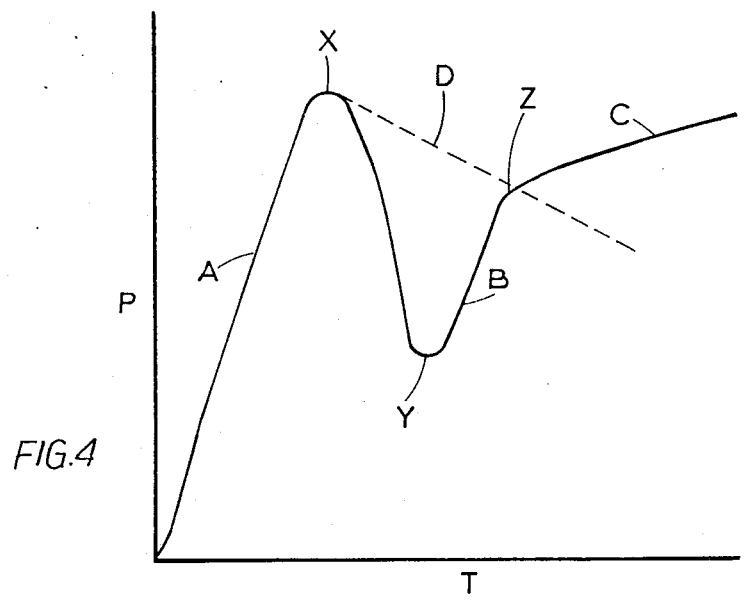
FIG. 4 is a graph showing the pressures in the braking system during a braking cycle.

FIG. 4 is a graph of brake pressure P plotted against time T with slope A showing braking pressure increase with time for an initial brake application until a skid occurs, whereafter the pressure decreases from skid point X to point Y at which the skid is corrected. Thereafter the braking pressure increases again as seen from slope B until the changeover point Z is reached after which the pressure continues to increase but at a slower rate as shown by C. The changeover point Z is determined by the decay of the memory pressure shown by the dotted line D, which commenced at the skid point X.

The gradient of the slope B, namely the rate of pressure rise in a brake re-application following correction of a skid, can be altered to suit local conditions by, in a modification, introducing a further restriction between the memory chamber 2 and the control chamber 36. This can be achieved for example, by varying the size of the passages 10 or 37.

If the solenoid is energised only for a short time the memory pressure will not have decayed significantly and so on re-application the braking pressure will rise very quickly to just below its former value. This is the situation on a surface of high adhesion.

If however the solenoid is energised for a longer period, as on a surface of low adhesive, then the memory pressure will have decayed to a much lower value.

On re-application therefore a small pressure rise occurs in the brakes at a high rate in the first stage before changing over to the lower rate in the second stage.

The latch valve 3 will remain shut during automatic brake re-application in a common cycle following a skid condition in order to isolate the memory chamber 2 and the control chamber 36 from which inlet 1, except through the restrictor 16 in the valve member 14.

Figure 2:
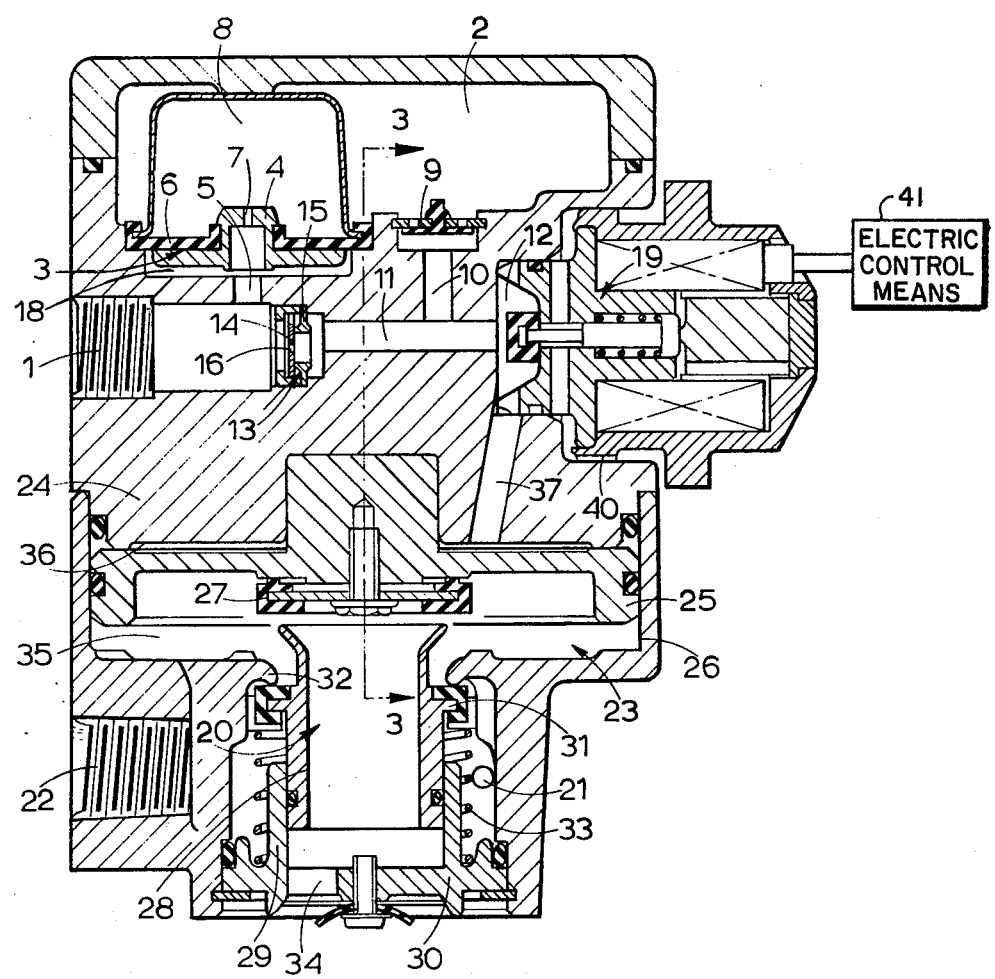
FIG. 2 is a transverse section on the line 2—2 of FIG. 1.
Figure 3:
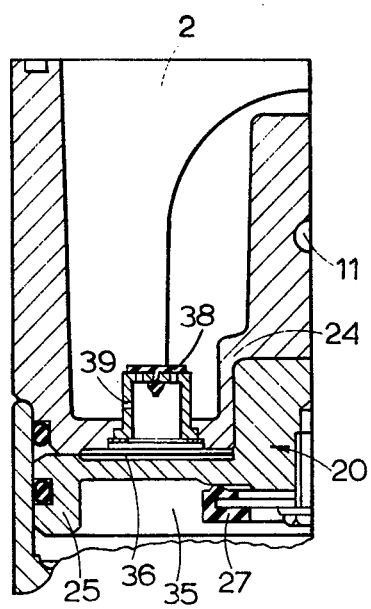
FIG. 3 is a scrap section on the line 3—3 of FIG. 2.

Upon release of the treadle valve, the components are restored to the relative positions shown in FIG. 2 with all chambers exhausted to atmosphere. The valve 14 ensures a rapid release at pressure and the latch valve opens.

I claim:

1. A fluid pressure-operated anti-skid braking system for vehicles comprising at least one actuator for applying a wheel brake, a supply of operating fluid for operating said actuator, fluid-flow control valve means interposed between said supply and said brake and through which pressure fluid from said supply is supplied to said actuator, deceleration responsive means responsive to a skid signal for operating said valve means to relieve pressure of said pressure fluid applied to said actuator at a skid point when the deceleration of said wheel is excessive and exceeds a pre-determined value, a memory for storing a memory pressure dependant on said pressure of said pressure fluid at said skid point, an orifice through which said memory pressure decays by leakage while said deceleration of said wheel exceeds said pre-determined value, said memory pressure directly operating said control valve means throughout a first stage of brake re-application, and providing a changeover point between said first stage and a second stage of brake re-application, said first stage comprising re-application of said operating fluid from said supply until an intermediate pressure less than said pressure of said pressure fluid is attained at said changeover point, and said second stage comprising continued re-application of said supply of said operating fluid at a reduced rate of pressure increase.

2. An anti-skid braking system as claimed in claim 1, wherein said memory pressure augmented after said changeover point by original operator-controlled pressure supplied at a reduced rate controls operation of said control valve means during said second stage of brake re-application.

3. An anti-skid braking system as claimed in claim 2, incorporating a restrictor through which said operator-controlled pressure can augment said memory pressure during said second stage.

4. An anti-skid braking system as claimed in claim 3, incorporating a latch valve which is normally open but which closes at said skid point, wherein said control valve means comprises a relay valve having an area exposed to a control pressure for operating said relay valve and until said skid point is reached, said control pressure comprises said operator-controlled pressure normally supplied to both said area and said memory through said latch valve which is open until said skid point is attained, thereafter said latch valve closing at said skid point and remaining shut during brake re-application in a common cycle so that said area can thereafter only be exposed to said memory pressure during said first stage of brake re-application and to said memory pressure augmented by said original operator-controlled pressure supplied at said reduced rate during said second stage of brake re-application.

5. An anti-skid braking system as claimed in claim 4, wherein a common housing of a single unit incorporates said control valve means, said deceleration responsive means, said memory, said latch valve and said restrictor, with a first inlet passage for connection to a supply of operator-controlled pressure housing said restrictor, a second inlet passage leading to one side of said control valve means, an outlet for connection to said wheel brake and a connection from an electric control means to said deceleration responsive means.

6. An anti-skid braking system as claimed in claim 1, wherein said orifice is located between said memory and a control chamber for operating said control valve means.

7. An anti-skid braking system as claimed in claim 6, wherein a further restriction is located between said memory and said control chamber for operating said control valve means to alter said rate of pressure rise in said first stage of brake re-application following a skid condition.

8. An anti-skid braking system as claimed in claim 7, wherein a pedal-operator air treadle valve comprises said operator-controlled pressure.

* * * * *